United States Patent
Wu et al.

(10) Patent No.: US 8,172,411 B2
(45) Date of Patent: May 8, 2012

(54) MULTI-CURVATURE CONVEX MIRROR HAVING AN ENHANCED FIELD OF VISION

(76) Inventors: Junzhong Wu, Linping (CN); Sheng Huang, Hangzhou (CN)

(*) Notice: Subject to any disclaimer, the term of this patent is extended or adjusted under 35 U.S.C. 154(b) by 0 days.

(21) Appl. No.: 12/957,043

(22) Filed: Nov. 30, 2010

(65) Prior Publication Data

US 2011/0075283 A1 Mar. 31, 2011

Related U.S. Application Data

(63) Continuation-in-part of application No. 12/077,063, filed on Mar. 14, 2008, now abandoned.

(30) Foreign Application Priority Data

Mar. 14, 2007 (CN) .................. 2007 2 0107256 U

(51) Int. Cl.
*B60R 1/08* (2006.01)
(52) U.S. Cl. ........................................... 359/868
(58) Field of Classification Search .............. 359/850, 359/866, 868
See application file for complete search history.

(56) References Cited

U.S. PATENT DOCUMENTS

| | | | |
|---|---|---|---|
| 4,730,914 A * | 3/1988 | Stout | 359/868 |
| 5,084,785 A * | 1/1992 | Albers et al. | 359/868 |
| 6,328,450 B2 * | 12/2001 | Englander | 359/853 |
| 7,012,761 B1 * | 3/2006 | Schmidt et al. | 359/708 |
| 2003/0123165 A1 * | 7/2003 | Lin | 359/868 |

FOREIGN PATENT DOCUMENTS

JP 11006908 A * 1/1999

* cited by examiner

*Primary Examiner* — Mark Consilvio

(57) ABSTRACT

A multi-curvature convex mirror is comprised of a first reflective surface having a first curvature and defined by a portion of the surface area of a greater sphere and a second reflective surface having a second curvature greater than the first curvature and defined by a portion of the surface area of a lesser sphere that intersects the surface area of the greater sphere. The primary and secondary reflective surfaces are comprised of a series of locations, each defined by an x, y, and z coordinate, determined in accordance with the relationship $$z = \frac{x}{a} + \frac{y}{b}$$

where $600 \leq a \leq 1{,}300$ and $100 \leq |b-a| \leq 200$.

7 Claims, 4 Drawing Sheets

MULTI-CURVATURE CONVEX MIRROR HAVING AN ENHANCED FIELD OF VISION

CROSS-REFERENCE TO RELATED APPLICATIONS

The present application is a continuation-in-part of U.S. patent application Ser. No. 12/077,063, filed on Mar. 14, 2008 now abandoned and having the same title, which is based upon and claims priority under 35 U.S.C. §119(a)-(d) from Chinese Patent Application No. 200720107256.8, filed Mar. 14, 2007. Each of these applications is hereby incorporated by reference in its entirety as if set forth herein in full.

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present disclosure relates to mirrors and, more particularly, to a convex mirror having multiple reflecting surfaces, each having a respective curvature.

To enhance safety during operation thereof, many vehicles, for example trucks, buses and automobiles, employ mirror systems that enable the drivers of the vehicles to see behind and/or to the side of the vehicle without turning their head in that direction. Such mirror systems typically include an interiorly-located mirror, commonly known as a "rear view" mirror, mounted in proximity to the upper interior side surface of the windshield, and a pair of exteriorly-located mirrors, commonly known as "side view" mirrors, respectively mounted on a forward portion of the door assemblies for the driver and front seat passenger.

Most mirrors used to enable a driver to look behind or to one side of a vehicle may be classified as flat, convex or aspherical mirrors. A flat mirror has a generally planar surface that tends to produce true and undistorted reflections of objects. However, because the field of vision produced by the planar reflective surface is relatively narrow, e.g. is typically bounded by planes generally orthogonal to the edges of the reflective surface, flat mirrors are characterized by a relatively large blind spot. In contrast, a convex mirror has a curved reflective surface and, when compared to a flat mirror, is generally characterized by a greater field of vision and a smaller blind spot. Indeed, as the curvature of the reflective surface is increased, the field of vision for the convex mirror increases while the size of the blind spot decreases. Thus, a mirror having a convexly curved reflecting surface will rectify many of the shortcomings of a mirror having a generally flat reflective surface. Unfortunately, convex mirrors are not without their own shortcomings, most notably, distortions in the images of objects reflected thereby and difficulties when attempting to accurately judge the distance separating the mirror from the reflected objects. Furthermore, the severity of these shortcomings tends to worsen as the curvature of the reflective surface increases.

An aspherical mirror typically includes two or more convexly curved mirror surfaces, each of which is curved to a different extent. For example, one aspherical mirror known in the art includes primary and secondary mirror surfaces. The primary mirror surface encompasses approximately two-thirds of the aspherical mirror and is a convex mirror having a relatively small curvature of the reflective surface which causes the primary reflective surface to approximate that of a flat mirror. Accordingly, reflections appearing in the primary reflective surface are true and undistorted. The secondary mirror surface, on the other hand, covers approximately one-third of the aspherical mirror and is a convex mirror having a larger curvature of the reflective surface relative to the curvature of the primary reflective surface. Accordingly, the secondary mirror compensates for a portion of the relatively narrow field of view and the blind spot characterizing flat mirrors such as the primary reflective surface. The transition from the primary reflective surface to the secondary reflective surface is smooth, thereby minimizing any problems resulting from the difference between the undistorted image/smaller field of vision of the primary reflective surface and the relatively more distorted/greater field of vision of the secondary reflective surface. However, as most aspherical mirrors require a relatively large difference in the degree to which the secondary reflective surface is curved in order to remove any blind spots caused by the primary reflective surface, the transition between the primary and secondary reflective surface remains relatively sharp, and, as a result, continues to affect proper judgment of the distance separating the mirror and an object reflected thereby.

It should be readily appreciated that a multi-curvature convex mirror which combines the advantages of a larger field of view and a reduced or eliminated blind spot when compared to a flat mirror while simultaneously reducing the distortion and difficulty in estimating separation distances normally associated with convex mirror would enjoy many advantages over both flat and convex mirror currently in use. Such a multi-curvature mirror is described hereinbelow.

BRIEF SUMMARY OF THE INVENTION

In one embodiment, claimed herein is a multi-curvature convex mirror comprised of a primary reflective surface having a first curvature and a secondary reflective surface having a second curvature. The secondary reflective surface is in the form of a series of locations arranged in a line extending from a first edge of the primary reflective surface to a second edge of the primary reflective surface. In alternate aspects thereof, the multi-curvature convex mirror is configured to provide a vertically-oriented field of vision or a horizontally-oriented field of vision and in still further alternate aspects thereof, the multi-curvature convex mirror is employed as a side-view or rear-view mirror for a vehicle. In a still further alternate aspect thereof, the primary and secondary surfaces are comprised of a series of locations, each defined by a x, y, and z coordinate, determined in accordance with the equation where $$z = \frac{x}{a} + \frac{y}{b}$$

where $600 \leq a \leq 1{,}300$ and $100 \leq |b-a| \leq 200$. In further accordance with this aspect, if a is less than b, then the multi-curvature mirror has a vertically oriented field of view while, if a is greater than b, then the multi-curvature mirror has a horizontally oriented field of view.

In another embodiment, disclosed herein is a multi-curvature convex mirror comprised of a first reflective surface defined by a portion of the surface area of a greater sphere and a second reflective surface defined by a portion of the surface area of a lesser sphere. In various aspects thereof, the second reflective surface or a portion of the second reflective surface may be defined by the intersection of the surface area of the greater sphere and the surface area of the lesser sphere or by the intersection of the surface area of a greater spheroid shape and the surface area of a lesser spheroid shape, may be defined by a plurality of surface deformations which collectively present discernable, variable curvatures or reflecting surfaces, or which present a composite reflecting surface of varying radii of curvature with the reflecting surfaces arranged in a linear pattern of alternating radii, and/or have a curvature larger than the curvature of the greater sphere and/or have a radius $r_1$ (for example, 700 mm) less than a radius $r_2$ (for example, 780 mm) of the greater sphere and a center point $c_1$ separated from the center point $c_2$ of the greater sphere by a distance $r_2-r_1$.

BRIEF DESCRIPTION OF THE SEVERAL VIEWS OF THE DRAWINGS

For a more complete understanding of the present disclosure, and for further details and advantages thereof, reference is now made to the drawings accompanying this disclosure, in which.

DETAILED DESCRIPTION OF THE INVENTION

Figure 1:
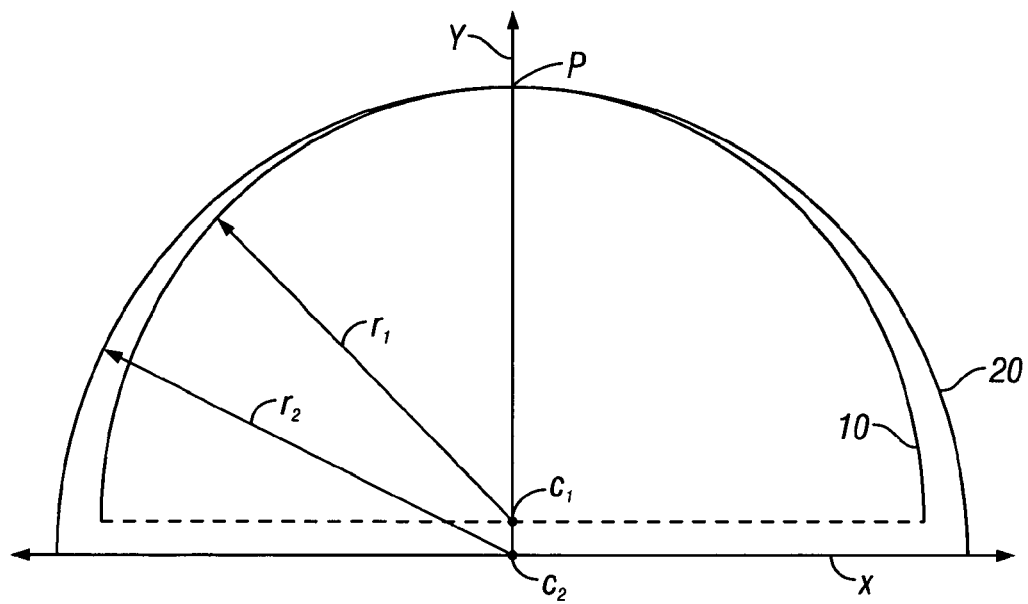
FIG. 1 is a first illustration which aids in an understanding of the principles underlying the teachings set forth herein.

The teachings set forth herein are susceptible to various modifications and alternative forms, specific embodiments of which are, by way of example, shown in the drawings and described in detail herein. It should be clearly understood, however, that the drawings and detailed description set forth herein are not intended to limit the disclosed teachings to the particular form disclosed. On the contrary, the intention is to cover all modifications, equivalents and alternatives falling within the spirit and scope of that which is defined by the claims appended hereto.

A. Theory

It is well known that a spherical surface is comprised of the set of all points in a three-dimensional space that are located a specified distance, commonly referred to as the radius r, from a single fixed point, commonly referred to as the center point c in that space. Further, as previously noted, the reflective surface of a convex mirror corresponds to a selected portion of a sphere. The multi-curvature convex mirror described and illustrated herein is based upon the concept that, rather than having the reflective surface of the mirror correspond to a selected portion of a single sphere, the reflective surface of the mirror should instead be configured such that a first portion of the reflective surface corresponds to a portion of the surface area of a first one of the pair of intersecting spheres and a second portion of the reflective surface corresponds to a portion of the surface of the second one of the pair of intersecting spheres. Of course it should also be appreciated that any number of intersecting spheres could define the reflective surface of the mirror described herein, with an accordant plurality of radii forming the reflective surfaces to achieve the desired results of reduced distortion and increased field of view.

The first sphere for which a portion of the surface thereof corresponds to a first portion of the reflective surface of the multi-curvature mirror has a center point $c_1$, and a radius $r_1$ and the second sphere for which a portion of the surface thereof corresponds to a second portion of the reflective surface of the multi-curvature mirror has a center point $c_2$ and a radius $r_2$. As $r_1<r_2$, the first sphere shall periodically be referred to as the "lesser" sphere while the second sphere shall periodically be referred to as the "greater" sphere. In the embodiment disclosed herein, the radius $r_1$, of the lesser sphere is approximately 700 mm and the radius $r_2$ of the greater sphere is approximately 780 mm. Of course, it should be clearly understood that the foregoing values are provided purely by way of example and that it is fully contemplated that, depending on the desired characteristics of the multi-curvature mirror to be produced thereby, one or both of the foregoing values may be varied.

As the radius $r_1$ of the lesser sphere is less than the radius $r_2$ of the greater sphere, it should be appreciated that, if the center points $c_1$ and $c_2$ shared the same coordinates (x,y,z), the lesser sphere would be entirely enclosed within the greater sphere. Here, however, the center point $c_1$, of the lesser sphere is located at coordinates $(x_1,y_1,z_1)$ while the center point $c_2$ of the greater sphere is located at coordinates $(x_2,y_2,z_2)$, the coordinates $(x_1,y_1,z_1)$ and $(x_1,y_1,z_1)$ selected such that the center points $c_1$, and $c_2$ are located in a common plane and separated, in the common plane, by a distance d equal to $r_2-r_1$, which, in the disclosed example would result in a distance d equal to approximately 80 mm. By arranging the respective center points $c_1$ and $c_2$ in this manner, the lesser and greater spheres shall intersect along a line.

A highly simplified 2-dimensional example of this principle is illustrated in FIG. 1. Here, corresponding halves of a lesser circle 10 having a center point $c_1$, and a radius $r_1$, equal to 700 mm and a greater circle 20 having a center point $c_2$ and a radius $r_2$ equal to 780 mm are shown. While the center point $c_2$ of the greater circle 20 is located at coordinates (x=0, y=0), the center point $c_1$ of the lesser circle 10 is offset +80 mm ($r_2-r_1$) along the Y-axis and is located at coordinates (x=0, y=80 mm). As a result, while the lesser circle is generally located within the greater circle 20, the lesser circle 10 intersects the greater circle 20 at a point P located along the Y-axis.

Figure 2:
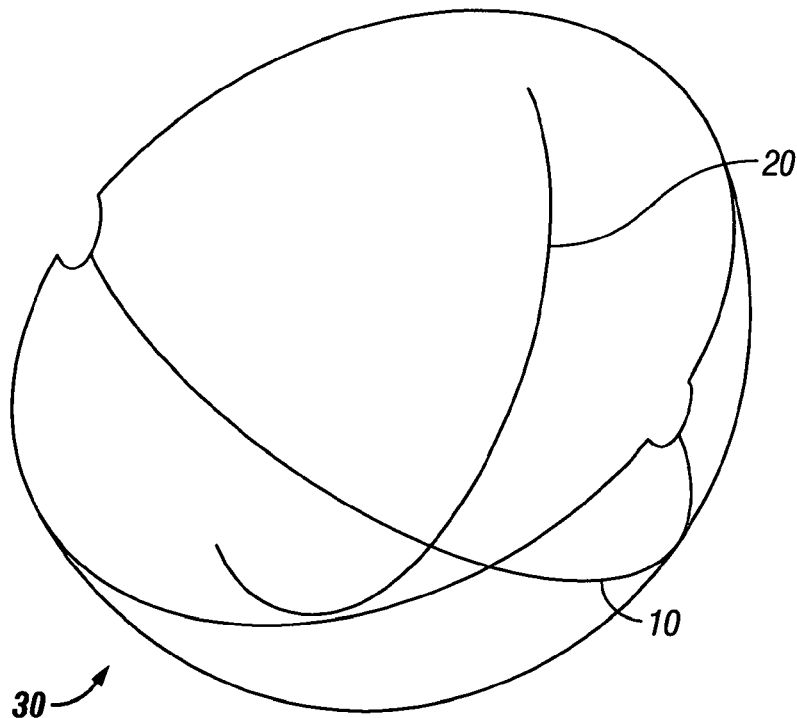
FIG. 2 is a second illustration which aids in an understanding of the principles underlying the teachings set forth herein.
Figure 3:
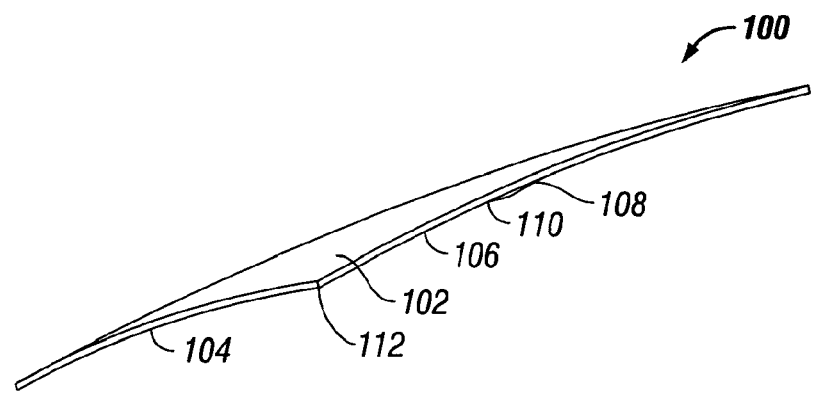
FIG. 3 is a perspective view of a multi-curvature convex mirror configured in accordance with the teachings set forth herein.

In FIG. 2, the foregoing example is extended to three dimensions. For ease of illustration, the lesser circle 10 is shown in FIG. 2 as extending along the X-axis while the greater circle 20 is shown as extending along the Y-axis. To generate the shape of the reflective surface 30, the greater circle 20 is rotated in the direction of the lesser circle 10, i.e., direction D in FIG. 2. When viewed from along the X-axis, the shape of the reflective surface 30 is the lesser circle 10, i.e., a curve defined by a 700 mm radius. When viewed from along the Y-axis, however, the shape of the reflective surface 30 is the greater circle 20, i.e., a curve defined by a 780 mm radius.

Presuming that the lesser sphere has a radius $r_1$ and a center point $(a_1,b_1,c_1)$, the greater sphere has a radius $r_2$ and a center point $(a_2,b_2,c_2)$ and a location on the reflective surface 30 collectively formed by the lesser sphere and the greater sphere is (x,y,z), the following relationship exists for the lesser sphere:

$$(x-a_1)^2+(y-b_1)^2+(z-c_1)^2=r_1^2.$$

Similarly, the following relationship exists for the greater sphere:

$$(x-a_2)^2+(y-b_2)^2+(z-c_2)^2=r_2^2.$$

From these relationships, it may be concluded that the following relationship exists for the reflective surface 30:

$$z=(r_2^2-r_1^2+a_1^2-a_2^2+b_1^2-b_2^2+c_1^2-c_2^2)/2(c_1-c_2)+x/(a_2-a_1)(c_2-c_1)+y/(b_2-b_1)(c_1-c_2)$$ which may be simplified to:

$$z = \frac{x}{a} + \frac{y}{b}$$

where:
x is the coordinate, along the x-axis, of a location on the reflective surface 30;
y is the coordinate, along the y-axis, of a location on the reflective surface 30;
z is the coordinate, along the z-axis, of a location on the reflective surface 30;
a is a first constant; and
b is a second constant.

Locations on the reflective surface 30 are determined by setting x to a first series of integral values such as 0, 1, 2, 3, . . . , N (or, if desired, to a series of non-integral values), setting y to a second series of integral such as 0, 1, 2, 3, . . . , N (or, if desired, to a second series of non-integral values) and solving for z when a is set to have a range from 600 to 1,300 i.e., $600 \leq a \leq 1,300$ and the absolute value of the difference between b and a shall be no less than 100 and no more than 200, i.e., $100 \leq |a-b| \leq 200$.

B. Practice

Collectively referring now to FIGS. 3-6, a mirror 100, for example, a side view mirror commonly employed by trucks, buses and automobiles, having a true and undistorted field of vision like that normally associated with a flat mirror but without the blind spot produced by such mirrors will now be described in greater detail. As may now be seen, the mirror 100 has a top side surface 102 which serves as a reflective surface for the mirror 100 and a bottom side surface 112 which serves as a base for the mirror 100. As may be further seen, the reflective surface 102 has a generally rectangular shape that is defined by a first edge surface 104, a second edge surface 106, the second edge surface 106 being longer than and generally orthogonal to the first edge surface 104, a third edge surface 108 generally orthogonal to the second edge surface 106, the third edge surface 108 being approximately the same length as and generally parallel to the first edge surface 104 and a fourth edge surface 110 generally orthogonal to the third edge surface 108, the fourth edge surface 110 being approximately the same length as and generally parallel to the second edge surface 106.

Figure 4:
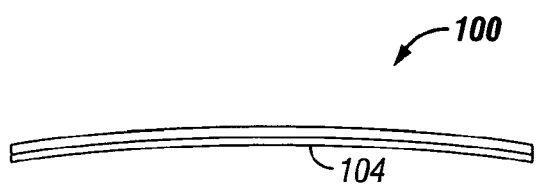
FIG. 4 is a first side view of the multi-curvature convex mirror of FIG. 1.
Figure 5:
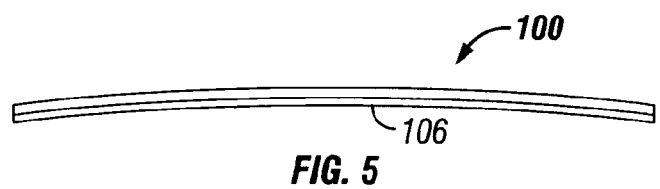
FIG. 5 is a second side view of the multi-curvature convex mirror of FIG. 1.
Figure 6:
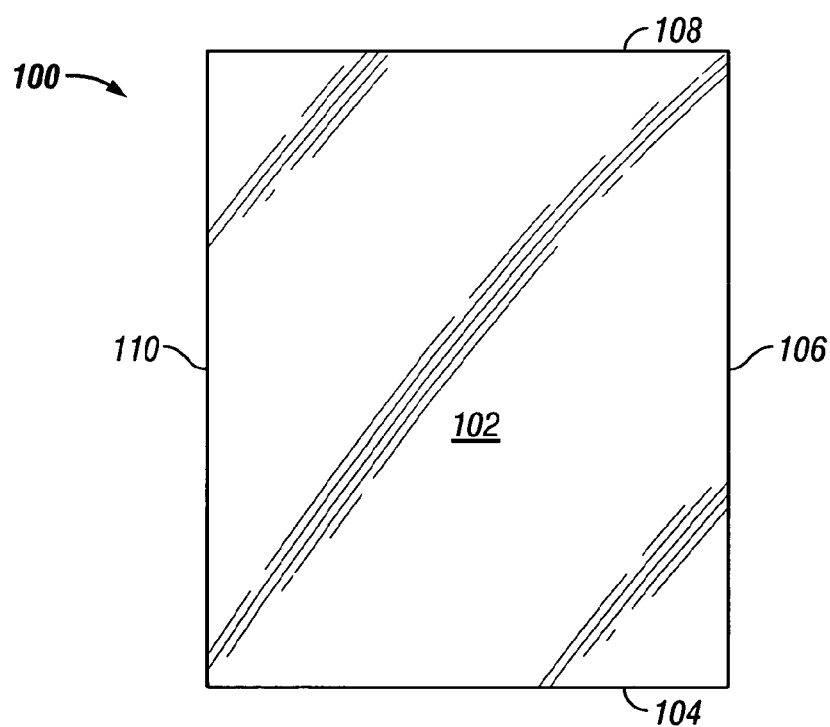
FIG. 6 is a top view of the multi-curvature mirror of FIG. 1.

As best seen in FIGS. 4 and 5, the general center of the mirror 100 bulges outwardly relative to the edge surfaces 104, 106, 108 and 110. Thus, the mirror 100 is a member of the family of mirrors commonly referred to as convex mirrors. It should be clearly understood, however, that the specific shape and relative dimensions of the convex mirror 100 illustrated in FIGS. 3-6 is purely exemplary and that it is fully contemplated that the mirror may be of a wide variety of shapes and sizes. The reflective surface 102 of the convex mirror 110 is a multi-curvature surface comprised of a first reflective sub-area having a first curvature and a second reflective sub-area having a second curvature. It should be clearly understood that the first reflective sub-area and the second reflective sub-areas may be supplemented by additional reflective sub-areas of similar or unique curvatures, as best seen in FIG. 7.

Figure 7:
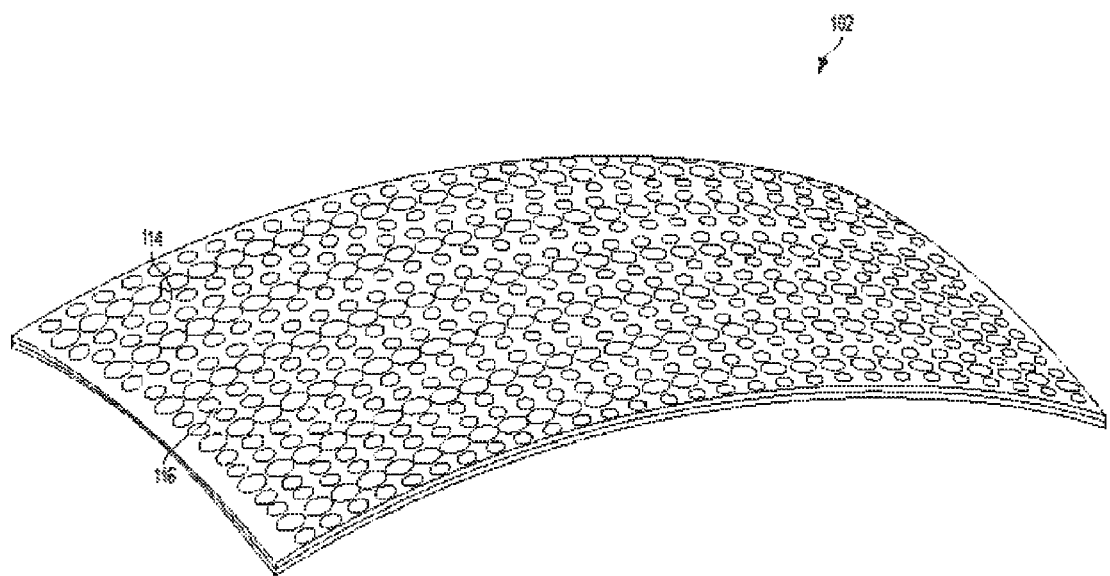
FIG. 7 is an enlarged perspective view of the multi-curvature convex mirror of FIG. 3.

Referring to FIG. 7, the reflective surface 102 comprised of a first reflective sub-area 114 having a first curvature and a second reflective sub-area 116 having a second curvature may now be seen in greater detail. As illustrated in FIG. 7, the reflective surfaces may be arranged on the mirror to create a multi-curvature surface by forming the surfaces such that they are arrayed in alternating bands of varying radii in the x and y axes. In the embodiment disclosed herein, the first reflective sub-area 114 has a first curvature which corresponds to a sphere having a radius of 780 mm while the second reflective sub-area 116 has a second curvature which corresponds to a sphere having a radius of 700 mm, although it should be understood that two or more reflective sub-areas may comprise the reflective surface 102 such that a plurality of reflective surfaces may be formed and arranged in a regular, alternating pattern of varying reflective sub-areas which may be equal or greater to reflective sub-areas 114 and 116. As previously set forth, the locations on the multi-curvature reflective surface 102 may be determined by setting x to 0, 1, 2, 3, . . . , N, setting y to 0, 1, 2, 3, . . . , N (or, if desired, to a second series of non-integral values) and solving for z where $$z = \frac{x}{a} + \frac{y}{b},$$

$600 \leq a \leq 1,300$ and $100 \leq |a-b| \leq 200$.

Figure 8:
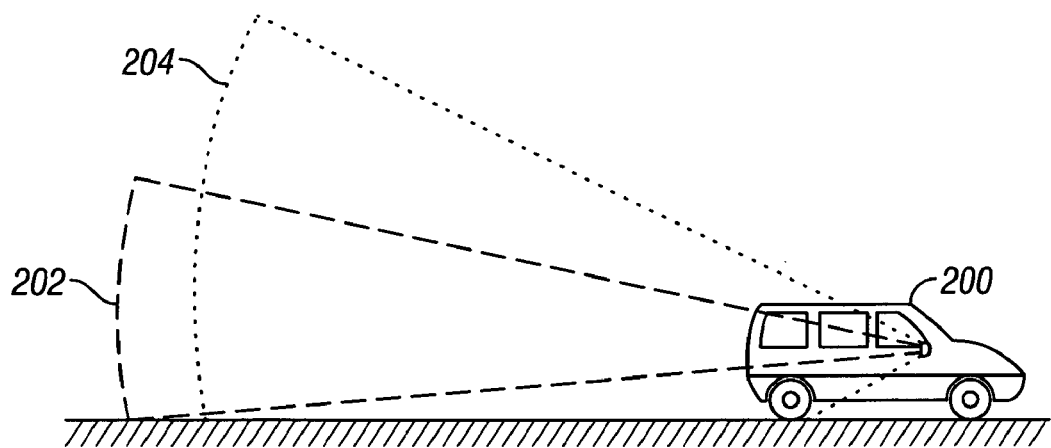
FIG. 8 illustrates the field of view for a vertically oriented embodiment of the multi-curvature convex mirror of FIGS. 3-7.
Figure 9:
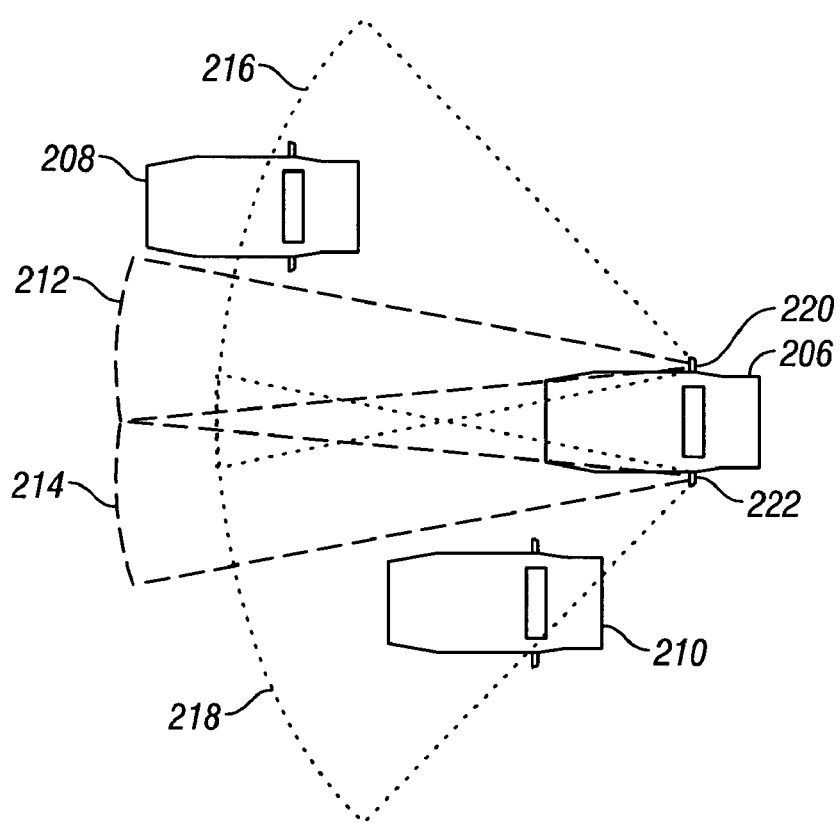
FIG. 9 illustrates the field of view for left horizontally oriented and right horizontally oriented embodiments of the multi-curvature convex mirror of FIGS. 3-7

Importantly, depending on the process by which locations for the reflective surface 102 are determined, the multi-curvature convex mirror 100 may have a vertically oriented field of view such as the field of view 204 produced by the multi-curvature convex mirror 200 illustrated in FIG. 8 or a horizontally oriented field of view such as the field of view 216, 218 produced by the multi-curvature convex mirror 220, 222, respectively, illustrated in FIG. 9. In this regard, it should be noted that, if the reflective surface 102 of the multi-curvature convex mirror 100 is to have a vertically oriented field of view, the additional condition that A is less than B should be applied to the above equation when determining the locations corresponding to the reflective surface 102 of the multi-curvature convex mirror 100. Conversely, if the reflective surface 102 of the multi-curvature convex mirror 100 is to have a horizontally oriented field of view, the additional condition that A is greater than B should be applied to the above equation when determining the locations corresponding to the reflective surface 102 of the multi-curvature convex mirror 100.

The process of forming the multi-curvature convex mirror 100 is comprised of a series of steps. First, employing the aforementioned equation with sets of the x, y and z parameters, a computer-generated model of the multi-curvature convex mirror 100 is produced. A mold to be used in manufacturing the multi-curvature convex mirror 100 is then formed. When forming the mold, it is recommended that rectangular material of approximately twice the size of the dimensions of the desired multi-curvature convex mirror 100, for example, mold square stock, be employed. In the embodiment disclosed herein, diatomite, a naturally occurring sedimentary rock, is used to construct the mold. Of course, it is fully contemplated that a wide variety of materials are suitable for use when constructing the mold.

The center of the rectangular material is then designated as the point of origin (0,0,0) from which the locations corresponding to the reflective surface 102 of the multi-curvature convex mirror 100 are identified. For a vertically oriented field of view, the locations are determined by proceeding downwardly from the point of origin. For a horizontally oriented field of view, the locations are determined by proceeding to the right of the square mold stock (if a right horizontally oriented multi-curvature convex mirror such as mirror 222 is desired) or by proceeding to the left of the square mold stock (if a left horizontally oriented multi-curvature convex mirror such as the mirror 220 is desired).

From the mold, a series of substrates, each having a surface that mirrors the surface of the computer-generated model of the multi-curvature convex mirror is produced. It is contemplated that float glass is a suitable material with which the substrates may be produced. Of course, any number of other materials is suitable for this purpose. Finally, it is contemplated that the multi-curvature convex mirrors are produced by coating the float glass with titanium, chromium, aluminum or other suitable reflective material.

The resultant multi-curvature convex mirror 100 is characterized by an enhanced field of view relative to conventional mirrors currently employed as rear or side view mirrors. For example, FIG. 8 shows the vertically oriented field of view 202 when the side view mirror of vehicle 200 is a conventional mirror 200 and the enhanced vertically oriented field of view 204 when side view mirror of vehicle 200 is a multi-curvature convex mirror. Further by way of example, FIG. 9 shows the left and right horizontally oriented field of views 212 and 214 when side view mirrors 220 and 222, respectively, of vehicle 206 are conventional mirrors and the left and right horizontally oriented field of views 216 and 218 when side view mirrors 220 and 222, respectively, of vehicle 206 are multi-curvature convex mirrors. As further seen in FIG. 9, the enhanced field of view 216, 218 resulting from use of the multi-curvature convex mirrors as the side view mirrors 220, 222 enable a driver to see vehicle 208, 210 (which are outside the field of view 212, 214.)

While a number of embodiments of a multi-curvature convex mirror have been shown and described herein, modifications thereof may be made by one skilled in the art without departing from the spirit and the teachings of the invention. The embodiments described herein are exemplary only, and are not intended to be limiting. Many variations, combinations, and modifications of the embodiments disclosed herein are possible and are within the scope of the teachings set forth herein. Accordingly, the scope of protection is not limited by the description set out above but is only defined by the claims appended hereto.

What is claimed is:

1. A multi-curvature convex mirror, comprising
 a primary reflective surface having a first convex curvature; and a plurality of second convex curvatures, defined by a series of discrete locations intermittently arranged in a line extending from a first edge of said primary reflective surface to a second edge of said primary reflective surface;
 wherein each location is defined by a surface deformation which presents a discernable variable curvature; and
 wherein said multi-curvature convex mirror is employed as a side-view mirror or as a rear-view mirror for a vehicle.

2. The multi-curvature convex mirror of claim 1, wherein said multi-curvature convex mirror is configured to provide a vertically oriented field of vision.

3. The multi-curvature convex mirror of claim 1, wherein said multi-curvature convex mirror is configured to provide a horizontally oriented field of vision.

4. The multi-curvature convex mirror of claim 1, comprising:
 wherein said first reflective surface is defined by a portion of the surface area of a greater sphere or oblate spheroid; and
 said plurality of second curvatures are each defined by a portion of the surface area of a lesser spheroid shape.

5. The multi-curvature convex mirror according to claim 4, wherein:
 said lesser spheroid has a center point $c_1$ and a variable radius $r_1$,
 said greater sphere has a center point $c_2$ and a radius $c_2$, said radius $r_2$ of said greater sphere being greater than said variable radius $r_1$ of said lesser sphere; and
 said center point $c_1$ of said lesser sphere being separated from said center point $c_2$ of said greater sphere by a distance equal to $r_2-r_1$.

6. The multi-curvature convex mirror according to claim 1, wherein said plurality of second curvatures are arranged alternately with respect to one another.

7. The multi-curvature convex mirror according to claim 5, wherein said greater sphere has a constant or variable radius which is larger than the radius of said lesser spheroid, which has a variable radius and which is smaller than the radius of said greater sphere.

* * * * *